United States Patent
Nestle

(10) Patent No.: US 7,213,472 B2
(45) Date of Patent: May 8, 2007

(54) CONNECTING PIECE FOR FLUID LINES

(75) Inventor: Volker Nestle, Esslingen (DE)

(73) Assignee: Festo AG & Co., Esslingen (DE)

( * ) Notice: Subject to any disclaimer, the term of this patent is extended or adjusted under 35 U.S.C. 154(b) by 57 days.

(21) Appl. No.: 10/529,320

(22) PCT Filed: Dec. 16, 2003

(86) PCT No.: PCT/EP03/14268

§ 371 (c)(1),
(2), (4) Date: Mar. 25, 2005

(87) PCT Pub. No.: WO2004/057280

PCT Pub. Date: Jul. 8, 2004

(65) Prior Publication Data

US 2006/0150729 A1   Jul. 13, 2006

(30) Foreign Application Priority Data

Dec. 19, 2002  (DE) ................ 102 59 395

(51) Int. Cl.
*G01F 1/37* (2006.01)
(52) U.S. Cl. .................................. 73/861.52
(58) Field of Classification Search . 73/861.52–861.53
See application file for complete search history.

(56) References Cited

U.S. PATENT DOCUMENTS 2,845,282 A    7/1958  Mueller
3,600,945 A *  8/1971  Wenzel et al. .......... 73/861.52
4,083,245 A *  4/1978  Osborn ................... 73/861.53
5,332,005 A *  7/1994  Baan ........................... 138/43
5,803,507 A    9/1998  Vu
5,861,546 A *  1/1999  Sagi et al. ............... 73/861.52
5,944,048 A    8/1999  Bump et al.
6,058,787 A *  5/2000  Hughes ................... 73/861.52
6,128,963 A * 10/2000  Bromster ................ 73/861.52
6,164,141 A * 12/2000  Chalvignac et al. ..... 73/861.52
6,578,435 B2 * 6/2003  Gould et al. ............ 73/861.52

FOREIGN PATENT DOCUMENTS

DE     200 08 129 U1   8/2000
EP     0664 879 B1     1/2000
GB     1427409         3/1976

* cited by examiner

*Primary Examiner*—Harshad Patel
(74) *Attorney, Agent, or Firm*—Hoffmann & Baron, LLP

(57) ABSTRACT

A connector (3) is suggested, which is capable of connecting a fluid line (28) to a fluid technology device. A connection channel runs between a device connection (24) and a line connection (25) in the connector (3). The connector (3) is equipped with a volume flow detection device (2) that has a mass flow sensor device (54), using which the volume flow through the connection channel (26) may be determined using a bypass channel (48).

18 Claims, 3 Drawing Sheets

CONNECTING PIECE FOR FLUID LINES

CROSS-REFERENCE TO RELATED APPLICATIONS

This application claims priority based on an International Application filed under the Patent Cooperation Treaty, PCT/EP03/14268, filed on Dec. 16, 2003, and German Patent Application No. DE 102 59 395.7, filed on Dec. 19, 2002.

FIELD OF THE INVENTION

The present invention relates to a connector for connecting a fluid line to a fluid technology device, such as a drive, a valve, or a maintenance device, having a line connection for fixing a fluid line, having a device connection for attachment to a fluid technology device, and having a connection channel, which runs between the line connection and the device connection and allows a fluid to flow through.

BACKGROUND OF THE INVENTION

A connector of this type is disclosed, for example, in German Utility Model 20008129. It allows a fluid line to be connected to a fluid technology device to be supplied with a pressure medium. A device connection, implemented as a screw connection, for example, allows the connector to be attached to the fluid technology device. A separate line connection allows the fixing of a fluid line, detachably in particular. In operation, pressure medium may flow in one or the other direction between the two connections, depending on the design of the connector, with the fluid flowing through a connection channel of the connector.

During operation of fluid technology devices, it is necessary in some cases to determine the volume flow rate, typically referred to simply as "volume flow", of pressure medium to and/or from the relevant fluid technology device. In such cases, connecting a volume flow sensor into the course of the fluid line is known, as is disclosed, for example, in DE 29821673 U1 or U.S. Pat. No. 5,332,005. In the case of DE 29821673 U1, the volume flow sensor contains a housing having a continuous axial channel in which a spring-loaded dam element is housed. The pressure medium flowing in displaces the dam element, which actuates a position sensor as a function of its position. In the case of U.S. Pat. No. 5,332,005, a laminar flow element is provided in order to cause a pressure drop of the medium flowing through. A bypass channel discharging before and after the laminar flow element is assigned to a mass flow sensor device, whose measured values allow the volume flow and/or the volume flow rate to be calculated.

Both known volume flow measurement devices require a cumbersome installation in the course of the fluid line. If it is a flexible fluid line, such as a compressed air hose, additional attachment measures are also to be made in order to fix the volume flow measurement device securely in place.

SUMMARY OF THE INVENTION

It is the object of the present invention to suggest measures which allow simpler volume flow measurement.

To achieve this object, in a connector of the type cited above, the connector itself is equipped with a volume flow detection device, which contains pressure drop generation means connected into the connection channel and a bypass channel discharging in the region of the pressure drop generation means at points in the connection channel at intervals in the running direction of the connection channel, a mass flow sensor device on or in the connector, which is placed outside the connection channel and is based on the calorimetric functional principle, being assigned to the bypass channel.

In this way, the volume flow detection device is implemented as a direct component of the connector and additionally requires no separate manufacturing or installation. During the installation of the connector, the volume flow detection device is also installed automatically, no separate attachment measures being necessary because the device connection provides the required secure fixing. The possibility exists of integrating the volume flow detection device into a typical standard connector. Overall, the instantaneous volume flow may be determined in extremely reduced spatial conditions. The use of a mass flow sensor device may be implemented extremely compactly, particularly if it was manufactured using micromechanical technologies. In addition, the possibility of determining the instantaneous mass flow as a function of the flow direction via the heat transfer detected may be provided (heat transfer anemometer).

The mass flow sensor device is expediently housed protected in a receiver housing, which is attached to the main housing of the connector containing the connection channel or is even partially or completely formed by this main housing. In this way, a protection classification of IP65 or better may be implemented without problems. If the receiver housing is provided with a removable cap, the mass flow sensor device may be replaced as necessary if changeover to other volume flow values is necessary.

The receiver housing expediently also contains an analysis electronics system, provided if necessary, of the volume flow detection device.

Especially small dimensions are possible if the mass flow sensor device is implemented as a chip. It may be implemented with high precision through the technologies of microsystem technology, such as molding or etching technologies or even micromechanical processing using appropriately miniaturized tools.

In all cases, the volume flow detection device allows a diagnosis of the fluid technology device equipped with the connector, the detected values able to be fed to a higher-order control unit, which initiates specific measures as a function of the result.

The pressure drop generation means are expediently a component of a replaceable insert element of the connector. In particular, the insert element may be replaceably installed in the main housing of the connector. The modular construction thus implemented allows the use of different pressure drop generation means in some cases as a function of the existing volume flow values. In order to obtain comparable pressure differential values, which are responsible for the flow through the bypass channel, for different flow rates, different pressure drop generation means may be used like building blocks without having to replace the mass flow sensor device. Therefore, the electronic components may be maintained and only the purely mechanical part has to be replaced.

The pressure drop generation means are expediently formed by a screen. Bidirectional measurement is thus favored. The flow in the bypass channel is expediently generated in this case by a suitable screen geometry having corner pressure sampling, the bypass channel discharging into the two corner regions between the screen and the channel sections in the connection channel adjoining on both sides.

Furthermore, it is advantageous if the volume flow measurement in the connector is additionally combined with a pressure and/or temperature measurement. In this way, the essential parameters of the flow may be detected and more extensive diagnostic measures may be performed.

The design of the connector is oriented to the conditions. An embodiment as an elbow in which the device connection and the line connection are oriented at an angle and particularly perpendicularly to one another appears especially expedient. In this way, an especially small construction is possible, particularly if the mass flow sensor device is placed on the side diametrically opposing the line connection.

In the following, the present invention will be described in greater detail on the basis of the attached drawing.

DETAILED DESCRIPTION OF THE PREFERRED DRAWINGS

Figure 1:
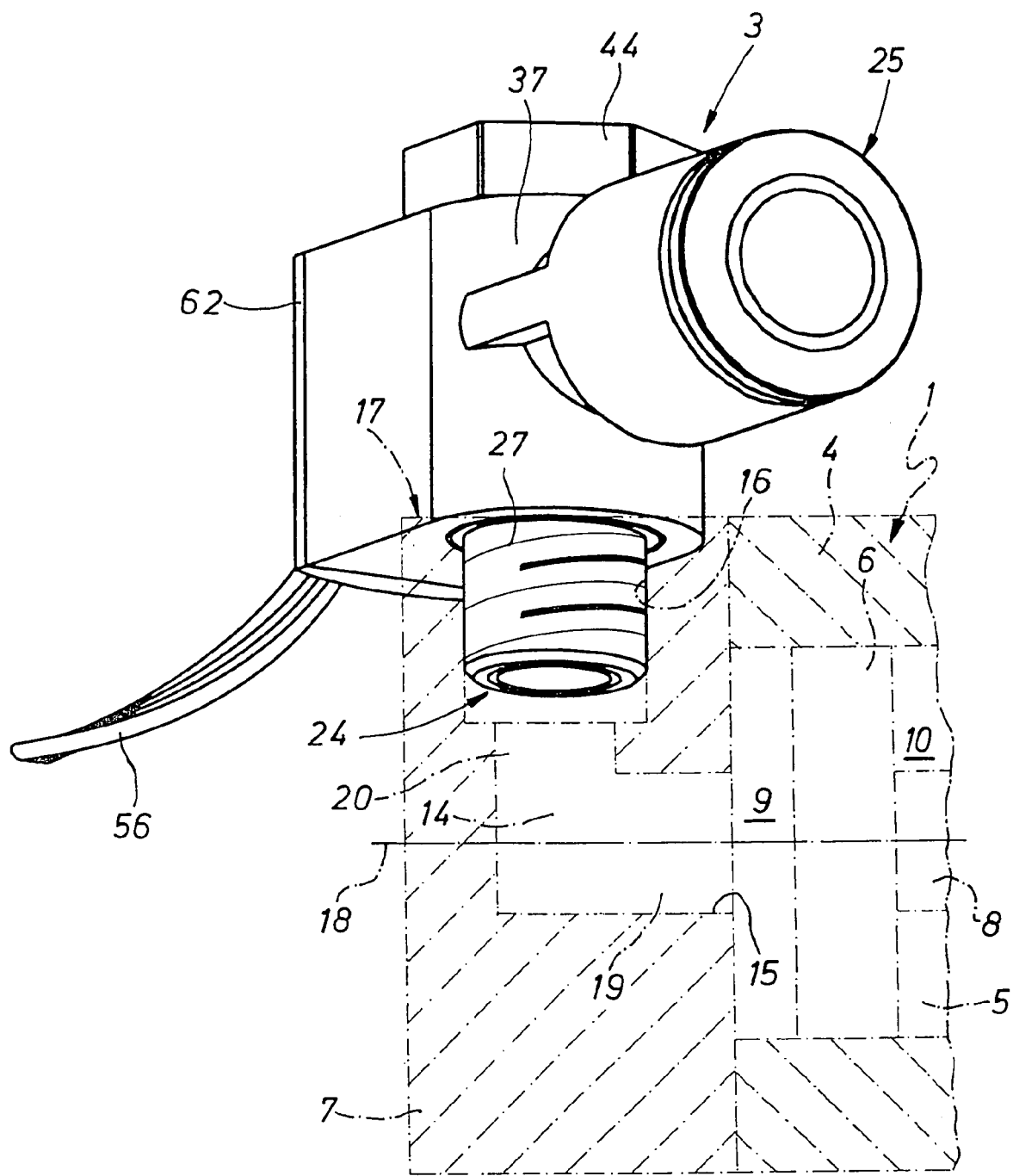
FIG. 1 schematically shows a fluid technology system having an end section of a fluid technology device (only indicated with dot-dash lines), which is equipped with a preferred construction of the connector according to the present invention.
Figure 2:
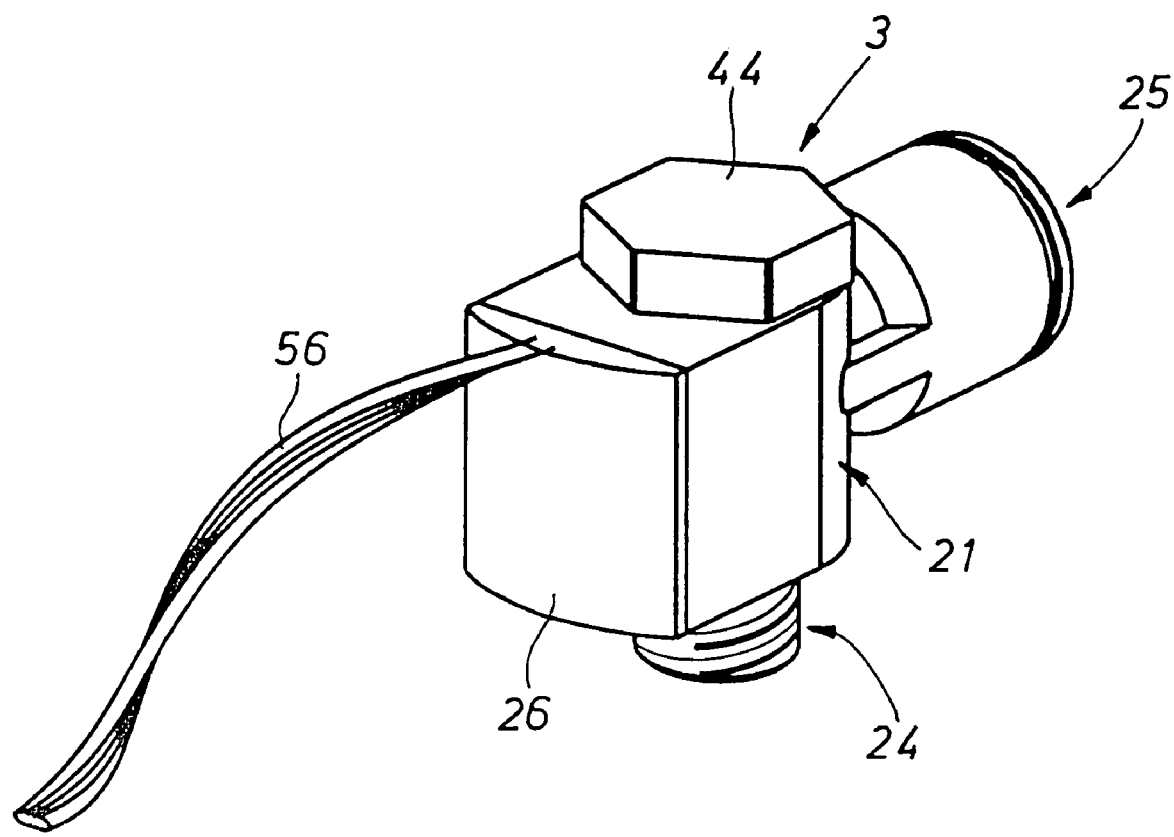
FIG. 2 shows the connector from FIG. 1, seen from another viewing direction.

FIG. 1 shows, using dot-dash lines, the end section of a fluid technology device 1 operated using pneumatic or hydraulic pressure medium, which is a drive actuated by fluid force in the exemplary embodiment, such as a pneumatic drive cylinder. The fluid technology device 1 may also be a different device type which is operated using fluidic pressure medium, such as a valve or a maintenance device for preparing compressed air.

The fluid technology device 1 of the exemplary embodiment, implemented as a linear drive, has an oblong device housing 4, which defines a housing interior 5 in which a piston 6 is positioned so it is axially displaceable. The housing interior 5 is closed on both front ends by a housing cap 7, only one of which is shown, however. A piston rod 8 connected to the piston 6 penetrates the housing cap 7 which is not shown and allows the connection to a component to be moved (not shown).

The piston 6 divides the housing interior 5 into two sealed operating chambers 9, 10, in relation to which a fluidic pressure medium may be supplied and removed in order to displace the piston 6 linearly in a desired way. The supply and removal of pressure medium in relation to the operating chamber 10 on the piston rod side is performed via a device channel inside the housing cap (not shown). The supply and removal of the pressure medium in relation to the operating chamber 9 lying on the diametrically opposite side of the piston 6 occurs through a device channel 14, which penetrates the device housing 4 and particularly runs in the housing cap 7. An internal mouth 15 of the device channel 14 particularly discharges coaxially into the assigned operating chamber 9 and an external mouth 16 is open to an external surface 17 of the device housing 4, provided on the housing cap 7.

The external mouth 16 is oriented perpendicularly to the longitudinal axis 18 of the fluid technology device in the exemplary embodiment, while in contrast the internal mouth 15 points in the direction of the longitudinal axis 18, so that the device channel 14 has a course bent by 90°. Specifically, the device channel 14 in the exemplary embodiment has an axial longitudinal section 19 originating from the internal mouth 15 and a radial longitudinal section 20 originating from the external mouth 16.

The supply and removal of the pressure medium is performed using a connector 3 of the construction according to the present invention. This connector 3 has the advantage that it is directly equipped with a volume flow detection device 2, which allows a very exact detection of the volume flow rate of the pressure medium flowing through the connector 3 and therefore flowing to or from the fluid technology device 1. A volume flow detection device 2 is thus integrated into the connector 3, which additionally has a double function and allows both flow guiding and volume flow detection with compact dimensions.

Figure 3:
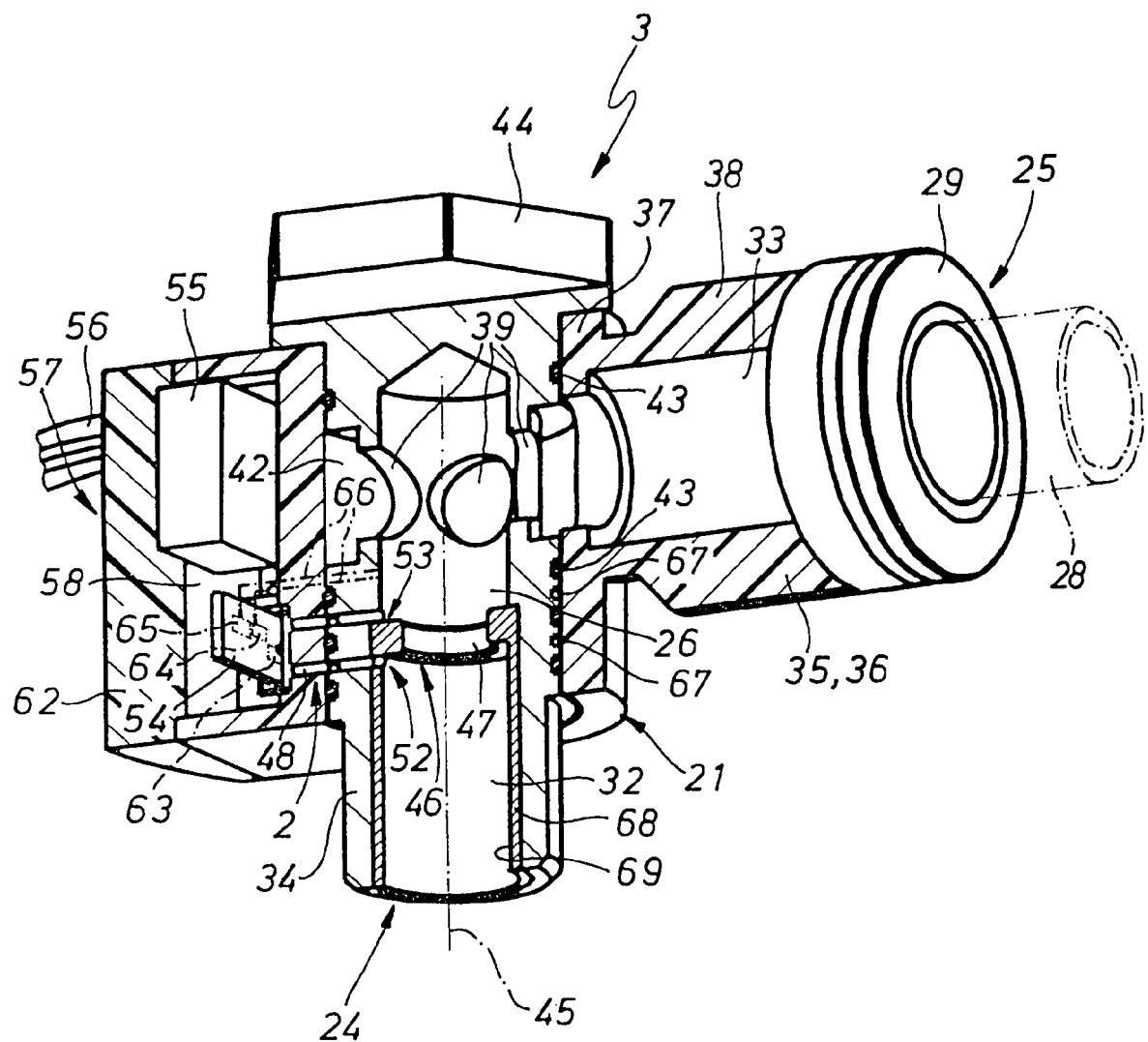
FIG. 3 shows a longitudinal section through the connector of FIGS. 1 and 2, a connected or connectable fluid line being indicated with dot-dash lines.

As may be seen in greater detail from FIG. 3 in particular, the connector 3 contains a main housing identified as a whole with reference number 21, which is equipped with a device connection 24 and, in addition, with a line connection 25. A connection channel, identified as a whole with reference number 26, runs inside the main housing 21 between the two connections 24, 25. Fluid may flow through the connection channel 26 between the two connections 24, 25—in both directions in the exemplary embodiment.

Using the device connection 24, the connector 3 may be attached, particularly removably, in the discharge region of the external mouth 16 of the device channel 14. The attachment is performed in the exemplary embodiment by screwing the device connection 24 into the external mouth 16 and the adjoining channel section. The device connection 24 is implemented as a hollow cylinder for this purpose and provided with an external thread 27, which may be screwed into a complementary internal thread of the device channel 14. The device connection 24 is thus a screw connection and may be inserted into the device channel 14 by a screwing procedure.

In an alternative construction (not shown in greater detail), the device connection 24 is implemented as a plug-in shaft, a plug-in connection device being located on the device side in the region of the external discharge 16, which allows the connector 3 to be attached through a plug-in procedure.

The line connection 25 is provided for removable attachment of a fluid line 28 in particular, indicated using dot-dash lines. The fluid line 28 may particularly be a pressure medium hose.

The line connection 25 may in principle also be implemented as a screw connection, in or on which a fluid line 28 may be attached through a screwing procedure. However, in the exemplary embodiment, it contains the preferred implementation of a plug-in connection, in which the fluid line 28 must merely be plugged in coaxially for connection. For removal, a removal element 29 of the line connection 25 is actuated, so that holding means (not shown) disengage from the wall of the fluid line 28 and the fluid line 28 may be pulled out without damage.

The connector 3 is implemented as an elbow in the exemplary embodiment. The two connections 24, 25 are positioned at an angle to one another and preferably perpendicularly to one another. The line connection 25 is placed laterally on the connector 3.

The connection channel 26 is divided into a first and a second connection channel section. These two connection channel sections 32, 33 run perpendicularly to one another in the exemplary embodiment. In addition, the two connection channel sections 32, 33 are housed in two separate components of the main housing 21, the first connection channel section 32 running in a first main housing body 34 having the device connection 24, while the second connection channel section 33 extends in a second main housing body 35 equipped with the line connection 25.

The two main housing bodies 34, 35 are coupled to one another. This may be a fixed connection, the exemplary embodiment providing a rotationally movable connection, however, since in this case the connector 3 is implemented like a pivoting screw fitting.

The second main housing body 35 is implemented as a pivot part, which is mounted so it is rotatable on the oblong first main housing body 34, particularly implemented as a hollow screw. For the rotating mounting, the pivot part 36 has an annular body 37 seated coaxially on the first main housing body 34, from which a connecting piece 38 projects radially, on whose free end the line connection 25 is provided.

The second connection channel section 33 penetrates the connecting piece 38 in the longitudinal direction and meets the first main housing body 34 in perpendicular alignment. The first connection channel section 32 is connected via a one or more radial holes 39 to a concentric annular channel 42 defined between the first main housing body 34 and the annular body 37. The second connection channel section 33 discharges on the internal surface of the annular body 37 at the height of the annular channel 42. In this way, it is always in fluidic connection with the first connection channel section 32, independently of the instantaneous rotational position of the pivot part 36.

Two axially spaced annular seals 43 between the two main housing bodies 34, 35 ensure leak-free fluid transition between the two connection channel sections 32, 33.

The first connection channel section 32 ends at the top of the connector 3 diametrically opposite the device connection 24, inside the first main housing body 34. A head 44 of the first main housing body 34 adjoins there, whose external surface is preferably designed so that a screwing tool may be placed to screw and unscrew the first main housing body 34 in relation to the device channel 14.

The connector 3 may also be implemented as a T-joint, for example, and have two line connections 25 which are diametrically opposite in relation to the longitudinal axis 45 of the first main housing body 34, both of which are connected to the connection channel 26.

The volume flow detection device 2 described above is equipped with pressure drop generation means 46 that are connected into the connection channel 26. They are preferably located in the first connection channel section 32 running in the first main housing body 34. They cause a pressure drop of the pressure medium flowing through them, so that, in relation to the flow direction, a higher pressure exists in front of them than after them. The pressure drop generation means 46 are preferably formed by a screen 47 which defines a narrow point that concentrically constricts the flow cross-section inside the connection channel 26.

A bypass channel 48 discharges into the connection channel 26 at two tap points 52, 53 in the region of the pressure drop generation means 46. The tap points 52, 53 are positioned at an interval to one another in the running direction of the connection channel, one of them being provided in front of and one of them after the pressure drop generation means 46, at least in connection with a screen 47.

If pressure medium flows through the connection channel 26 during operation of the connector, a pressure differential between the two channel sections separated from one another by the screen 47 arises in the connection channel 26. This pressure differential results in a part of the pressure medium flowing around the screen 47 through the bypass channel 48. The tap points 52, 53 are expediently located here in the two corner regions between the screen 47 and the channel sections of the connection channel 26 adjoining on both sides, so that this may be called corner pressure sampling.

A mass flow sensor device 54, provided on or in the connector 3, which is placed outside the connection channel 26 and is based on a calorimetric functional principle, is assigned to the bypass channel 48. The mass flow sensor device 54 determines the mass flow flowing through the bypass channel 48, which has a relatively small diameter in comparison to the connection channel 26, this mass flow being correlated in an analysis electronics system 55, also provided on or in the connector 3, to the flow in the connection channel 26. Therefore, the desired measured values may finally be tapped via electrical cables 56 connected to the analysis electronics system 55 or via other electromechanical connection measures.

The mass flow sensor device 54 is housed together with the analysis electronics system 55 in a receiver housing 57, which is implemented as a component of the connector 3. This may be a separate component that is fixed on the main housing 21 by any arbitrary fasteners. In the exemplary embodiment, the receiver housing 57 is partially formed by the main housing 21, which thus assumes a double function.

The receiver housing 57 defines a receiver chamber 58, which contains the above-mentioned components. This receiver chamber 58 may be made accessible by removing a removable housing cap 62 of the receiver housing 57. The individual components may thus be replaced easily in case of defect.

The receiver housing 57 is expediently provided on the second main housing body 35. It is expediently located on the diametrically opposite side from the line connection 25 in relation to the longitudinal axis 45. The mass flow sensor device 54 is correspondingly also positioned in this region. This allows very compact dimensions in the longitudinal direction of the first main housing body 34, i.e., in the height direction of the connector 3.

As a further measure which allows very compact dimensions, the mass flow sensor device 54 is implemented as a chip that is manufactured through known technologies of microsystem technology. It contains an active chip surface 63 which is positioned so that it is contacted by the pressure medium flowing through the bypass channel.

The mass flow sensor device 54 may determine not only the volume flow through the bypass channel, but rather is also capable of detecting the flow direction. In this case, the measurement method of heat transfer anemometry is applied. Since the flow direction in the bypass channel corresponds to the instantaneous flow direction in the connection channel 26, the volume flow detection device 2 is thus also capable of detecting the flow direction of the pressure medium in the connection channel.

It is indicated solely using dot-dash lines in FIG. 3 that the connector, in addition to the volume flow detection device 2, may also be equipped with pressure detection means 64 and/or with temperature detection means 65 for detecting the corresponding data of the pressure medium provided in the connection channel. The measured values are preferably tapped via corresponding tap channels 66 directly in the connection channel 26. The active components are expediently located directly on the chip possibly also provided, like the active chip surface 63.

In order that the pivot part 36 is rotatable, the channel branches of the bypass channel leading to the two tap points 52, 53 are divided in a comparable way into two channel sections, as is the case in the connection channel 26. An annular channel 67, which is provided between the annular body 37 and the first main housing body 34 and which guarantees a fluid connection independently of the particular rotational position of the pivot part 36, extends between each of the two channel sections.

The connector 3 of the exemplary embodiment is distinguished by high flexibility in regard to the measurement range which may be processed. The volume flow detection device 2 may in turn be used for measuring different sizes of volume flows in the connection channel 26 without being replaced. In this case, a simple replacement of the pressure drop generation means 46 suffices. In the exemplary embodiment, the screen 47 provided is replaced by a screen having a larger or smaller screen diameter for this purpose. Comparable pressure differentials, which the mass flow sensor device 54 may process easily, thus arise at the screen independently of the volume flow.

In the exemplary embodiment, the modularity is implemented in that the pressure drop generation means 46—here: the screen 47—are a component of an insert body 68, which is also fixed replaceably in the main housing 21.

The insert body 68 is a sleeve-shaped component having a molded-on screen 47 in the exemplary embodiment. It may be inserted into a complementary receiver 69 of the first main housing body 34, its internal circumference simultaneously defining a longitudinal section of the first connection channel section 32.

During the manufacturing or during later use of the connector 3, multiple insert bodies 68 may be provided, which have different cross-sectional geometries and may be used alternately in the receiver 69 in accordance with the flow conditions to be expected.

The invention claimed is:

1. A connector for connecting a fluid line to a fluid technology device having a line connection for fixing a fluid line, having a device connection for attachment to a fluid technology device, and having a connection channel, which runs between the line connection and the device connection and allows a fluid to flow through, wherein the connector itself is equipped with a volume flow detection device, which comprises pressure drop generation means provided in the connection channel and which comprises a bypass channel discharging into the connection channel in the region of the pressure drop generation means at points spaced in the running direction of the connection channel, wherein a mass flow sensor device on or in the connector is assigned to the bypass channel, said mass flow sensor device being placed outside the connection channel and being based on a calorimetric functional principle, said connector further comprising a main housing containing the connection channel, wherein the main housing has a first main housing body having the device connection, which has a first connection channel section and a second main housing body having the line connection, which has a second connection channel section that communicates with the first connection channel section, and wherein the second main housing body is implemented as a pivot part which is mounted so that it is rotatable on the first main housing body.

2. The connector according to claim 1, wherein the mass flow sensor device is housed in a receiver housing, which is positioned on the main housing or is at least partially formed by the main housing.

3. The connector according to claim 2, further comprising a removable cap of the receiver housing.

4. The connector according to claim 1, wherein the volume flow detection device has an analysis electronics system that works together with the mass flow sensor device.

5. The connector according to claim 4, wherein the mass flow sensor device and the analysis electronics system are housed in a receiver housing positioned on the main housing or at least partially formed by the main housing.

6. The connector according to claim 1, wherein the mass flow sensor device is housed in a receiver housing, the receiver housing being provided on the second main housing body.

7. The connector according to claim 1, wherein the mass flow sensor device is implemented as a chip.

8. The connector according to claim 1, wherein the mass flow sensor device is a component constructed in microsystem technology.

9. The connector according to claim 1, wherein the pressure drop generation means are replaceable.

10. The connector according to claim 9, wherein the pressure drop generation means are a component of a replaceable insert body.

11. The connector according to claim 10, wherein the insert body defines at least one longitudinal section of the connection channel.

12. The connector according to claim 1, wherein the pressure drop generation means are formed by a screen.

13. The connector according to claim 12, wherein the bypass channel discharges into the connection channel in the two corner regions between the screen and the sections of the connection channel adjoining on both sides.

14. The connector according to claim 1, wherein the connector is an elbow having connections oriented at an angle to one another.

15. A connector according to claim 14, wherein the mass flow sensor device is positioned on the side diametrically opposite the line connection.

16. The connector according to claim 1, further comprising additional pressure detection means for the fluid pressure existing in the connection channel.

17. A connector according to claim 1, further comprising additional temperature detection means for detecting the fluid temperature existing in the connection channel.

18. A connector for connecting a fluid line to a fluid technology device comprising:
  a main housing including a first housing part having an inlet, a second housing part having an outlet, a connection channel formed therein and extending between said inlet and said outlet for permitting fluid flow therebetween and a bypass channel in fluid communication with said connection channel;
  a pressure drop generator disposed within said connection channel adjacent said bypass channel; and
  a mass flow sensor device contained within said main housing and in fluid communication with said bypass channel for measuring a pressure drop generated by said pressure drop generator within said connection channel,
  wherein said second housing part is pivotably coupled to said first housing part whereby said second housing part is rotatable with respect to said first housing part.

* * * * *